(12) United States Patent
Matsumura et al.

(10) Patent No.: US 7,322,918 B2
(45) Date of Patent: Jan. 29, 2008

(54) SOFT CONTAINER AND METHOD OF MANUFACTURING THE CONTAINER, AND HIGHLY VISCOUS CONDITIONED LIQUID FILLED BODY

(75) Inventors: Masayoshi Matsumura, Takatsuki (JP); Tetsuya Katayori, Takatsuki (JP); Eiji Hattori, Takatsuki (JP)

(73) Assignees: Sunstar Engineering Inc., Takatsuki-shi (JP); Hosokawa Yoko, Co., Ltd., Tokyo (JP); Polymer Systems Co., Yokohama-shi (JP)

( * ) Notice: Subject to any disclaimer, the term of this patent is extended or adjusted under 35 U.S.C. 154(b) by 687 days.

(21) Appl. No.: 10/380,765

(22) PCT Filed: Sep. 20, 2001

(86) PCT No.: PCT/JP01/08161

§ 371 (c)(1),
(2), (4) Date: Aug. 11, 2003

(87) PCT Pub. No.: WO02/24539

PCT Pub. Date: Mar. 28, 2002

(65) Prior Publication Data

US 2004/0026432 A1 Feb. 12, 2004

(30) Foreign Application Priority Data

Sep. 25, 2000 (JP) .............................. 2000-290895

(51) Int. Cl.
  *B31B 1/90* (2006.01)
(52) U.S. Cl. ...................... 493/108; 493/102; 493/104; 493/274

(58) Field of Classification Search ................ 493/108, 493/269, 274, 308, 104, 103, 102
See application file for complete search history.

(56) References Cited

U.S. PATENT DOCUMENTS

| 142,963 | A | * | 9/1873 | Tenny ......................... 222/183 |
| 2,252,854 | A | * | 8/1941 | Hubner et al. ................. 156/69 |
| 3,183,802 | A | * | 5/1965 | Rutledge .................... 493/292 |
| 3,399,516 | A | * | 9/1968 | Hough, Jr. et al. ........... 55/487 |

(Continued)

FOREIGN PATENT DOCUMENTS

JP  58-1656  1/1983

(Continued)

*Primary Examiner*—Sameh H. Tawfik
(74) *Attorney, Agent, or Firm*—Kratz, Quintos & Hanson, LLP

(57) ABSTRACT

The flexible container relating to the present invention comprises a cylindrical member (10) made from flexible film, a bottom plate member (12) which is harder than the flexible film, fitted into the inner side of a first end section of the cylindrical member (10) and fused-bonding airtightly; and a ring member (11) which is harder than the flexible film, fitted into the inner side of a second end section of said cylindrical member (10) and fused-bonding airtightly. According to this flexible container (2), it is possible greatly to reduce the volume of the container after discharging the highly viscous material from the flexible container, and it is possible to achieve small and inexpensive moulds having excellent productivity as moulding equipment for forming the bottom plate member (12) and the ring member (11), thereby achieving benefits in that the price of the equipment can be reduced significantly.

4 Claims, 16 Drawing Sheets

U.S. PATENT DOCUMENTS

| | | | | |
|---|---|---|---|---|
| 4,531,930 A | * | 7/1985 | Clauss | 493/108 |
| 4,551,123 A | * | 11/1985 | Inagaki | 493/108 |
| 5,029,749 A | * | 7/1991 | Aloisi | 229/400 |
| 5,081,820 A | * | 1/1992 | Nedstedt | 53/456 |
| 5,672,308 A | * | 9/1997 | Fujita | 264/248 |
| RE35,830 E | * | 6/1998 | Sadlier | 220/592.17 |
| 6,165,115 A | * | 12/2000 | Rea | 493/109 |
| 6,176,069 B1 | * | 1/2001 | Kossendrup | 53/471 |
| 6,463,968 B1 | * | 10/2002 | Hattori et al. | 141/114 |
| 6,676,585 B1 | * | 1/2004 | Stahlecker et al. | 493/87 |
| 6,764,435 B1 | * | 7/2004 | Hennessy | 493/52 |

FOREIGN PATENT DOCUMENTS

| | | |
|---|---|---|
| JP | 61-192543 | 8/1986 |
| JP | 61-203357 | 9/1986 |
| JP | 63-110151 | 5/1988 |
| JP | 5-71143 | 9/1993 |
| JP | 6-67342 | 9/1994 |
| JP | 3056663 | 12/1998 |

* cited by examiner (a)

(b)

(c)

(d)

(a)

(b)

(c)

(d)

(a)

(b)

SOFT CONTAINER AND METHOD OF MANUFACTURING THE CONTAINER, AND HIGHLY VISCOUS CONDITIONED LIQUID FILLED BODY

TECHNICAL FIELD

The present invention relates to a flexible container suitable for charging with a highly viscous material, such as a sealant, or the like, a method of manufacturing the container, and a highly viscous material charged container.

BACKGROUND ART

As illustrated by the charged container 100 shown in FIG. 19, a widely used charged container wherein a sealant for construction, or the like, is charged into a container, is one comprising a hard cylindrical container main body 103, which has an discharge hole 102 for discharging the sealant 101 formed at the front end portion thereof and which is open at the other distal end portion thereof, and a plunger 104 inserted inside the distal end portion of the container main body 103. In this charged container 100, a composition is adopted whereby, after releasing a lid 105 for closing the discharge hole 102 and cutting open a virgin film 106, a nozzle (not illustrated) is fitted to the discharge hole 102, the container is set in a special discharge gun and by operating a lever of the discharge gun, the plunger 104 is caused to move towards the front end side of the container main body 103, so that the sealant is extruded and discharged from the nozzle of the discharge hole 102.

In a charged container 100 having a composition of this kind, since it is possible to expel practically all of the air between the plunger 104 and the sealant 101, externally, and since the airtightness between the plunger 104 and the container main body 103 can be guaranteed satisfactorily, so that is widely used at present, but since the container main body 103 is rigid, it is not possible to compress the container main body 103 to a small size after all of the sealant 101 has been discharged, and hence there are limits on the volume reduction of the container main body 103 and a problem arises in that the volume of the waste material is very large.

Consequently, a flexible container has been proposed, in Japanese Patent Laid-open No.(Hei)7-171461, for example, which comprises an intermediate cylindrical section made from a flexible film, and a relatively hard upper moulding section and lower moulding section provided integrally with the front end portion and the other distal end portion of the intermediate cylindrical section. By setting a container in which the sealant is charged into this flexible container, on the outer tube of a discharge gun, and then moving the lower moulding section towards the upper moulding section, the sealant can be extruded and discharged from a nozzle of the discharge hole formed in the upper moulding section, whilst crushing the intermediate cylindrical section, and therefore, after the sealant 101 has been squeezed completely, the flexible container will be in a small size, thereby enabling to reduce the volume of the waste material.

Moreover, the abovementioned patent discloses a moulding method using insert injection mould as a method for manufacturing a flexible container wherein, firstly, the film is rolled on the mandrel and fabricated into an intermediate cylindrical section which is open at both ends, whereupon it is set in the mould of an insert injection moulding equipment which is formed with circumference moulding spaces at positions corresponding to the lower moulding section and the upper moulding section, and a synthetic resin is injected into the circumference moulding spaces, thereby forming the upper moulding section and the lower moulding section integrally with both ends of the intermediate cylindrical section.

However, the aforementioned moulding method using insert injection mould involves problems in that: it requires expensive injection moulding equipment; in setting the intermediate cylindrical section in the mould, a large mould is required, and the productivity are low compared to the large size of the mould equipment; and in the case of containers having the same diameter but different capacity (length), different moulds are required. For the manufacturer of the containers, the lower the productivity, the greater the price of the equipment.

DISCLOSURE OF THE INVENTION

The flexible container according to the first phase of the present invention comprises: a cylindrical member made from flexible film; a bottom plate member which is harder than the flexible film, fitted into the inner side of a first end section of the cylindrical member and fused-bonding airtightly; and a ring member which is harder than the flexible film, fitted into the inner side of a second end section of the cylindrical member and fused-bonding airtightly.

In this flexible container, since the cylindrical member is made from flexible film, it is possible to reduce the volume of the container by crushing the cylindrical member after the contents have been discharged, and hence the volume of the container can be reduced remarkably. Moreover, since the bottom plate member and ring member are harder than the flexible film, a charged container comprising a viscous liquid or gel like substance can be handled easily with maintaining its shape. Furthermore, in this flexible container, since the bottom plate member and the ring member are inserted into the cylindrical member and then fused-bonding airtightly, the bottom plate member and the ring member can be fabricated independently from the cylindrical member, and therefore it is possible to use a small size equipment and inexpensive moulds having excellent productivity for forming the bottom plate member and the ring member; and moreover, since the bottom plate member and the ring member can be fabricated separately in an exclusive moulding line, then it is possible to cut the price of the equipment.

In the flexible container according to the second phase of the present invention, a fitting section comprising a circumference groove section or a circumference projection section is formed in the fused injection portion of the cylindrical member and the bottom plate member and/or the ring member. By forming a fitting section of this kind, it is possible to fuse-bonding the cylindrical member with the bottom plate member and/or the ring member whilst effecting tensile force on the cylindrical member in the circumferential direction thereof, in such a manner that no distortion occurs in the cylindrical member, and hence fuse-bonding faults between the cylindrical member and the bottom plate member and/or the ring member due to formation of wrinkles are prevented, and the airtightness between both the members is increased dramatically. Moreover, since the surface area of tight bonding between the cylindrical member and the bottom plate member and/or the ring member is increased in accordance with the area of the fitting section, the bonding strength between both the members is increased, as well as improving the airtightness therebetween.

In the flexible container according to the third phase of the present invention, a fitting section constituted by a circumference projection section is formed in a waveform shape which oscillates in the axial direction of the cylindrical member. By adopting this composition, the insertion of the bottom plate member and/or the ring member onto the cylindrical member can be performed readily. In other words, if a composition is adopted wherein the fitting section is constituted by a circumference projection section which does not oscillate in the axial direction, when the cylindrical member is fitted into the fitting section, the full circumference of the cylindrical member will come in contact tightly with the fitting section simultaneously, and will expand in the outward radial direction, thereby making it difficult to insert the cylindrical member, but is the fitting section is formed so as to oscillate in the axial direction, then the circumferential position of the cylindrical member which is caused to expand by the fitting section is changed step by step or continuously, and it is prevented that the full circumference of the cylindrical member is caused to expand at the same time, thereby improving the insertability of the cylindrical member.

The method for manufacturing a flexible container relating to the fourth phase of the present invention comprises the steps of: forming a flexible film into a roll and fabricating a cylindrical member therefrom; fitting a bottom plate member which is harder than the flexible film into the inner side of a first end section of the cylindrical member and fused-bonding airtightly, and fitting a ring member which is harder than the flexible film into the inner side of a second end section of the cylindrical member and fused-bonding airtightly.

In this manufacturing method, similarly to the first phase of the present invention, since a bottom plate member and a ring member are fitted to the inner side of a cylindrical member and fused-bonding airtightly, it is possible to cut the price of the equipment, and moreover, since the bottom plate member and the ring member are harder than the flexible film, it is possible to fabricate the flexible container which is easy to handle and the volume of which can be reduced greatly after discharging the content.

In the method of manufacturing a flexible container according to the fifth phase of the present invention, the cylindrical member is formed into a tapered tubular shape which decreases in diameter at the first end side, the bottom plate member is caused to face an opening at the second end side of the cylindrical member, and the bottom plate member is inserted into the first end side of the cylindrical member by relative movement of the cylindrical member and the bottom plate member, thereby fitting the bottom plate member to the first end section of the cylindrical member. In this case, since the bottom plate member can be fitted into the first end side by inserting the bottom plate member to the first end side whilst expanding the cylindrical member, the integration of the bottom plate member can be improved remarkably, and moreover, by adopting a composition wherein the inner diameter of the cylindrical member is equal to or slightly smaller than the external diameter of the bottom plate member, it is possible to fit airtightly the bottom plate member without distortion of the cylindrical member, and hence fused-bonding faults between the cylindrical member and the bottom plate member due to the formation of wrinkles are prevented and both the airtightness between the members can be improved.

The method of manufacturing a flexible container according to the sixth phase of the present invention comprises the steps of: fixing concentrically a bottom plate member and a ring member to a mandrel, leaving an interval therebetween approximately equal to the width of a flexible film; and winding a flexible film about the mandrel in such a manner that the bottom plate member and the ring member are positioned on both side ends of the flexible film in the lateral direction, and in this state, fuse-bonding airtightly the external circumferences of the bottom plate member and the ring member to both sides of the flexible film in the lateral direction, and fuse-bonding both side edges of the flexible film together in the longitudinal direction, in an airtightness.

In this manufacturing method, similarly to the first phase of the present invention, since the bottom plate member and the ring member are fitted to the inner side of the cylindrical member and fused-bonding airtightly therewith, it is possible greatly to cut the price of the equipment, and moreover, since the bottom plate member and the ring member are harder than the flexible film, it is possible to fabricate a container which is easy to handle and the volume of which can also be reduced greatly after discharging the content from the container. In addition, since a flexible film is wound about a bottom plate member and a ring member and then fused-bonding airtightly, it is possible to improve the integration of the bottom plate member and the ring member dramatically compared to a case where the bottom plate member and the ring member are fabricated in the mould of an insert injection mould into a cylindrical member made from flexible film, and since handling of the cylindrical member made from flexible film is not required, it is possible to prevent the moulding faults due to deformation of the cylindrical member, or the like.

In the method of manufacturing a flexible container according to the seventh phase of the present invention, when fused-bonding the cylindrical member to the bottom plate member and/or the ring member, the cylindrical member is fused-bonding by heat to the bottom plate member and/or the ring member in a plurality of operations, using a heating plate having a plurality of semicircular heating faces, which press against the flexible film of the cylindrical member on the outer circumference of the bottom plate member and/or the ring member, and which are positioned in such a manner that non-heating gaps of a prescribed length where the cylindrical member is not heated are formed in between the adjacent heating faces in contact with the cylindrical member. In order to increase the integration of the bottom plate member and the ring member with respect to the cylindrical member, desirably, the inner diameter of the cylindrical member would be set to a diameter equal to or slightly larger than the external diameter of the bottom plate member or the ring member, but if set in this manner, when fuse-bonding the cylindrical member to the bottom plate member or the ring member, the wrinkles will appear in the cylindrical member and it will not be possible to guarantee the fitting characteristics and the airtightness due to fused-bonding faults in these sections. In particular, if the heat fuse-bonding is performed using a heating plate combining a plurality of heating faces having a circumference, the slackening of the cylindrical member will concentrate at the boundary region between adjacent heating faces, and large wrinkles may be formed in these regions, having not the airtightness. In the invention relating to the seventh phase of the present invention, since non-heating gaps of a prescribed length are formed between adjacent heating faces, after the first heat bonding operation, the bottom plate member and/or the ring member and the cylindrical member are rotated through a prescribed angle, and the portions corresponding to the non-heating gaps of the previous operation are heat fused-bonding by the heating faces, but since the slackening of the cylindrical member in the first heat bonding operation is gathered in the non-heating gaps, it is possible to prevent formation of large wrinkles during the second heat bonding operation, and thus the decrease of airtightness due to wrinkles in the cylindrical member can be effectively prevented.

In the method of manufacturing a flexible container according to the eighth phase of the present invention, the range of forming the non-heating gaps is set to 20-30° at the central angle of the arc shape of the heating faces. By forming the non-heating gaps, the slackening of the cylindrical member positioned at the non-heating gaps during the first heat bonding operation is dispersed, and therefore it is possible reliably to prevent the decrease of airtightness due to wrinkles in the cylindrical member.

In the method of manufacturing a flexible container according to the ninth phase of the present invention, projection strips for forming a bonding section are formed along the full length of the heating faces, in the intermediate section thereof in the lateral direction. In this case, since a bonding section consisting of the circumference groove sections is formed at the fused-bonding section of the cylindrical member and the ring member or the bottom plate member, it is possible to improve the airtightness and the bonding strength between the cylindrical member and the bottom plate member and/or the ring member remarkably.

In the highly viscous material charged container relating to the tenth phase of the present invention, a highly viscous material is charged into a flexible container according to any one of the first to the third phases of the present invention, and a lid member is plugged airtightly into the ring member, in such a manner that no air remains inside the flexible container.

In this charged container, since a highly viscous material is charged into a flexible container according to any one of the first to the third phases of the present invention, effects similar to the foregoing are obtained. Moreover, when plugging a lid member into the ring member, since the lid member can be closed up tightly to the ring member, without the cylindrical member being interposed therebetween, it is possible to improve the airtightness between the lid member and the ring member.

BEST MODE FOR CARRYING OUT THE INVENTION

Below, an embodiment of the present invention is described with reference to the drawings.

Firstly, the composition of the highly viscous material charged container is described.

Figure 1:
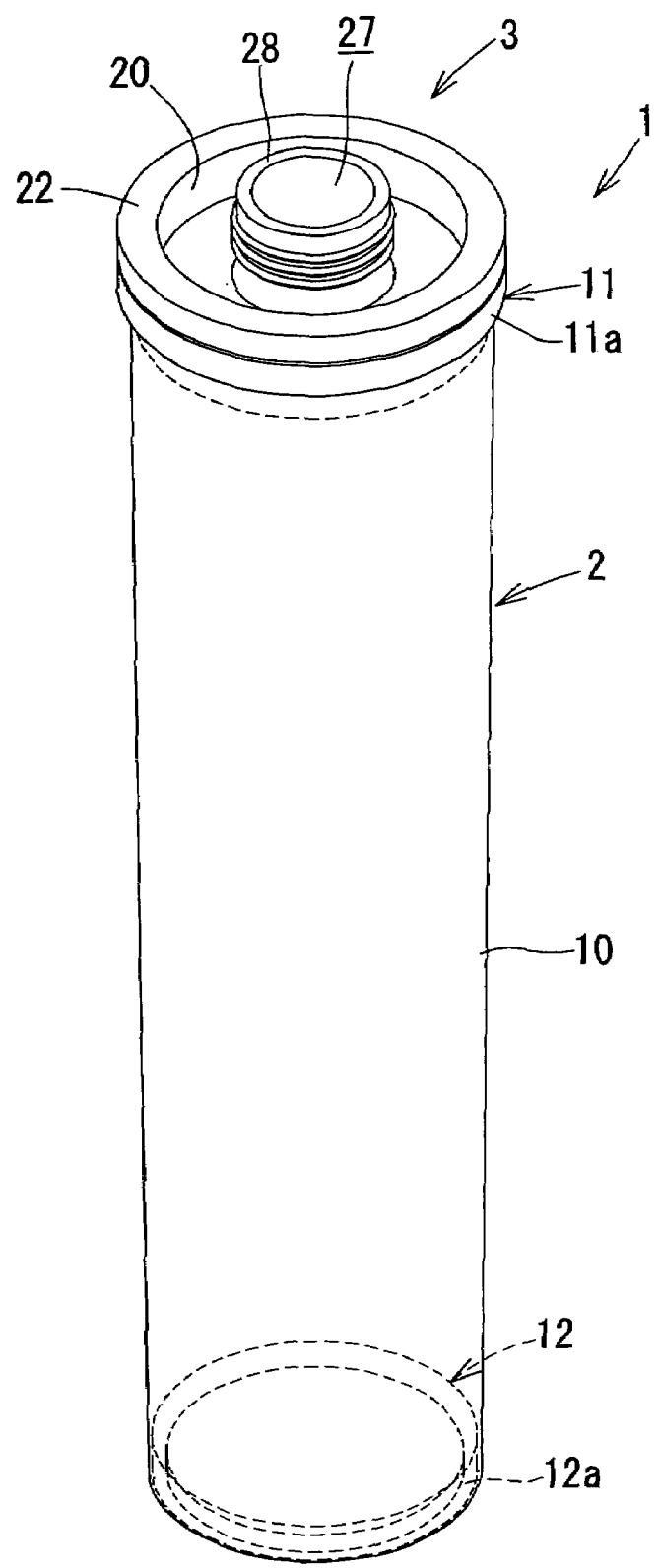
FIG. 1 is an oblique view of a highly viscous material charged container.
Figure 2:
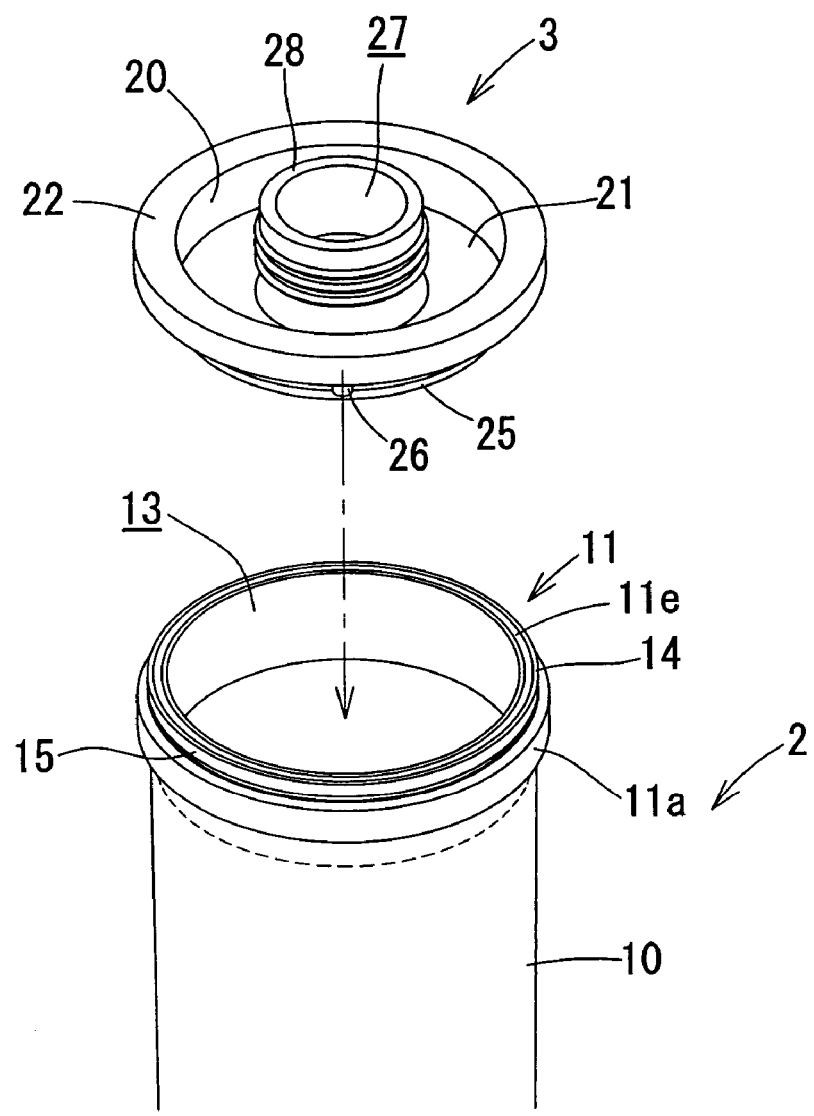
FIG. 2 is an exploded view of a highly viscous material charged container.
Figure 3:
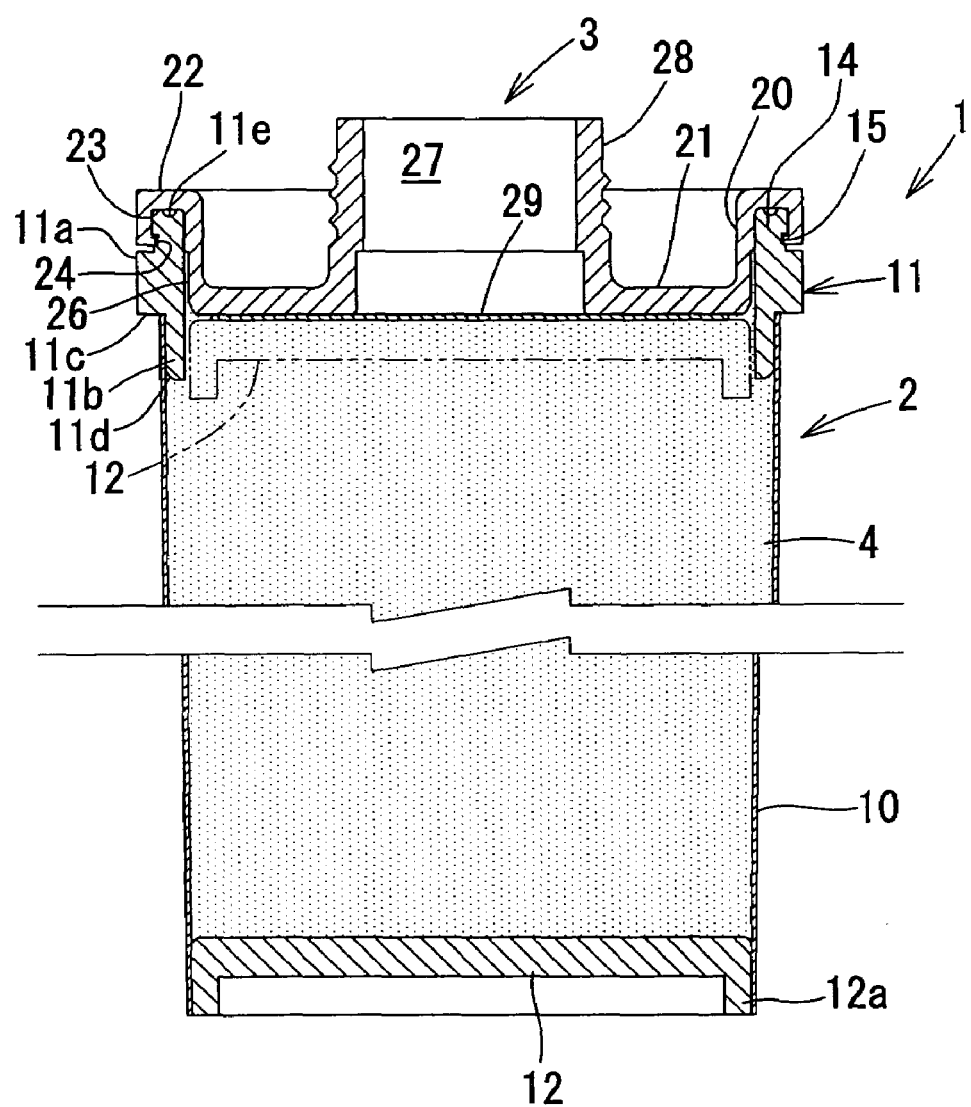
FIG. 3 is a principal vertical sectional view of a highly viscous material charged container.

As shown in FIG. 1 to FIG. 3, the highly viscous material charged container 1 comprises a flexible container 2 having an approximately cylindrical shape with a bottom, a lid member 3 which fits airtightly into the flexible container 2, and a highly viscous material 4 consisting of a sealant for construction, or adhesive, or the like, charged inside the flexible container 2.

To describe the flexible container 2, a cylindrical member 10 made from a flexible film is provided, a ring member 11 which is harder than the cylindrical member 10 is provided integrally on the upper end portion of the cylindrical member 10, and an approximately circular disc bottom plate member 12 which is harder than the cylindrical member 10 is provided integrally on the inner side of the lower end portion of the cylindrical member 10, an opening section 13 being formed by the ring member 11 in the upper end portion of the flexible container 2 and the lower end portion of the flexible container 2 being closed by the bottom plate member 12.

The cylindrical member 10 is formed by rolling a flexible film such that the respective edges thereof are overlapping, and fuse-bonding the overlapping section together by means of a heat bonding, ultrasonic bonding, high-frequency induction bonding, or the like, to create a cylindrical shape. The cylindrical member 10 can be formed to a uniform diameter throughout its length, but desirably, it is formed as a slightly tapered cylindrical shape which decreases in diameter towards one end thereof, in order that it can be removed readily from cylindrical mandrel used when forming the cylindrical shape. Moreover, as described hereinafter, in order to achieve a composition wherein the bottom plate member 12 is fitted inside the ring member 11 in such a manner that the highly viscous material 4 contained therein is squeezed up almost completely, desirably, the bottom plate member 12 is fitted at the bottom end section (first end section) having a smaller diameter in the cylindrical member 10, and the ring member 11 is fixed to the upper end section (second end section) having a larger diameter. It is also possible to fabricate this cylindrical member 10 by means of extrusion moulding, or the like.

The flexible film forming the cylindrical member 10 can consist of any material provided that it is flexible enough to be easily crushable, and it may comprise a single layer structure or a multiple layer structure made from resin film alone, or it may use a film having a composite structure wherein a metal foil, such as aluminium foil, or the like, is laminated between resin films. In the present embodiment, a film having a three-layer structure or four-layer structure comprising aluminium foil laminated between resin films was used and was fabricated into a cylindrical shape by rolling the film such that the respective edges thereof were overlapping, and then heat bonding. A thermoplastic resin capable of being heat fused-bonding, such as polyethylene, polyester, polypropylene, nylon, or the like, is suitable for use as the resin film. Moreover, the inner and the outer resin films may be composed of the same, but since the fusing-conditions of the inner face and the outer face are different, it is desirable that resin films made corresponding to these fusing-conditions are used. For example, if a sealant for construction use is to be charged into the flexible container 2, as the highly viscous material 4, then desirably, polyethylene or polypropylene film which does not change in quality, or the like, upon contact with sealant, is used for the resin film of the inner face, on the other side, in the case of the resin film for the outer face, polyester or nylon film having rigidity and gas barrier properties is used accordingly.

With regard to fuse-bonding with the cylindrical member 10, the ring member 11 and the bottom plate member 12 are constituted with similar resin constituting the inner face of the cylindrical member 10. By fabricating the ring member 11 and the bottom plate member 12 separately from the cylindrical member 10 in this manner, it is possible to fabricate the ring member 11 and the bottom plate member 12 in small moulding equipment having excellent productivity, and moreover, since the ring member 11 and the bottom plate member 12 can be fabricated by separate exclusive moulding equipment to the container 2, it is possible to cut the price of the equipment.

A circumference vertical wall section 12a is formed extending downwards at the outer circumference of the bottom plate member 12, and by fitting the bottom plate member 12 inside this lower end portion of the cylindrical member 10 and fuse-bonding the cylindrical member 10 from the outer face thereof, it is fitted airtightly with the lower end portion of the cylindrical member 10.

Figure 4:
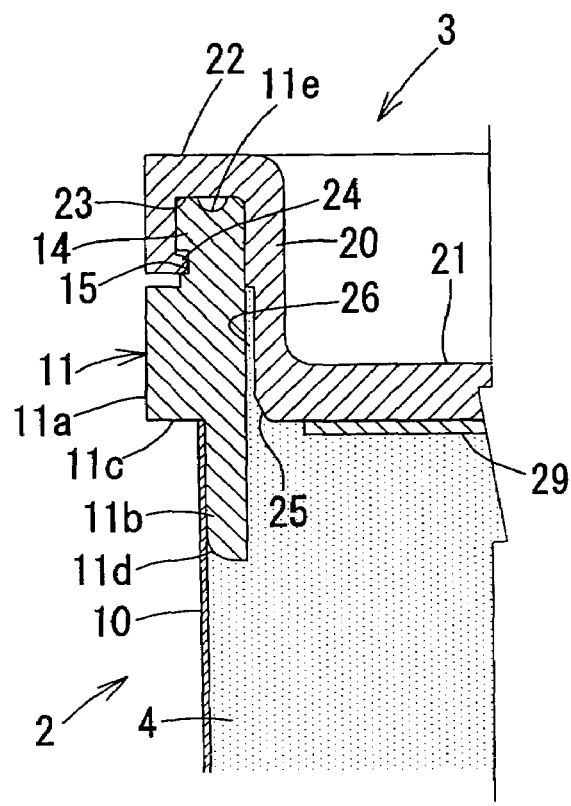
FIG. 4 is a principal vertical sectional view of the region of a ring member.
Figure 5:
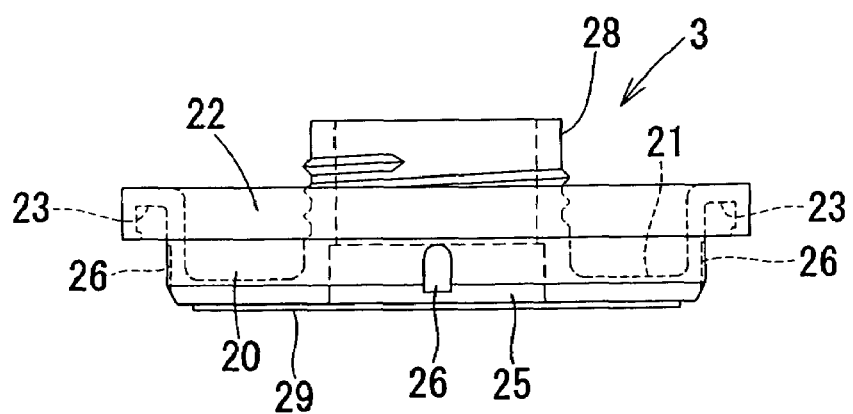
FIG. 5 is a side view of a lid member.

Moreover, as shown in FIG. 2 to FIG. 4, a large diameter section 11a is formed in an intermediate portion of the ring member 11, and a small diameter section 11b is formed on the lower half portion thereof, a step section 11c being formed between the large diameter section 11a and the small diameter section 11b. By fitting the small diameter section 11b of the ring member 11 inside the upper end portion of the cylindrical member 10 and fuse-bonding the cylindrical member 10 from the outer face thereof, the ring member 11 is fitted airtightly with the upper end portion of the cylindrical member 10. Fuse-bonding of the cylindrical member 10 to the ring member 11 and the bottom plate member 12 is performed by means of heat bonding, ultrasonic bonding, high-frequency induction bonding, or the like, and by forming a plurality of continuous and circumference groove lines or projection lines by means of this fuse-bonding, an airtightness is formed between the ring member 11 and/or the bottom plate member 12, and the cylindrical member 10.

In order to insert and fix the lid member 3 to the ring member 11, an inserting section 14 is formed in the upper portion of the ring member 11, and a fitting groove 15 is formed in the outer circumference of the inserting section 14. Moreover, a slant face lid which decreases in diameter towards the lower side is formed in the lower end portion of the outer circumference of the ring member 11, thereby achieving a composition wherein, as described hereinafter, when the cylindrical member 10 is fixed externally to the ring member 11, the end portions of the cylindrical member 10 are guided by this slant face lid. Moreover, a circumference groove 11e is formed in the upper end portion of the fitting section 14, thereby achieving a composition wherein, as described hereinafter, when the lid member 3 is plugged over the ring member 11, a part of the highly viscous material 4 overflows into the upper side circumference groove 11e, in such a manner that the airtightness is raised by the infiltrated highly viscous material 4.

As shown in FIGS. 1 to 5, the lid member 3 is formed integrally with a sliding tube section 20 which is inserted into the ring member 11, a lid main body 21 which extends inwards from the bottom end of the sliding tube section 20 and closes off the opening section 13 of the flexible container 2, and a collar section 22 which extends outwards from the upper end of the sliding tube section 20. A reverse side circumference groove 23 which is open in the lower direction and fixes externally on the inserting section 14 of the ring member 11 is formed in the collar section 22, and a circumference projection 24 which interlocks in a reciprocal manner with the fitting groove 15 of the ring member 11 is formed in the collar section 22 in such a manner that it projects into the reverse side circumference groove 23.

When the sliding tube section 20 of the lid member 3 is inserted into the ring member 11, and the inserting section 14 of the ring member 11 is fitted into the reverse side circumference groove 23 of the lid member 3, and moreover, the circumference projection 24 of the lid member 3 is interlocked with the circumference fitting groove 15 of the ring member 11 and the outer circumference of the collar section 22 is fused (welded) bonding to the ring member 11, then the lid member 3 and the ring member 11 are fixed airtightly. Moreover, it is also possible to coat some lubricating oil, or the like, onto the outer face of the sliding tube section 20 in advance, when fixing the lid member 3 to the ring member 11, in such a manner that the sliding tube section 20 is inserted smoothly onto the ring member 11.

In order that no air remains inside the flexible container 2 when the lid member 3 is fixed onto the ring member 11, a slant corner section 25 which decreases in diameter towards the lower side is provided on the outer circumference of the lower end of the sliding tube section 20 of the lid member 3, and a groove section 26 expels the gas, the lower end of which is open to the inside of the flexible container 2 and the upper end portion of which extends to the collar section 22, is formed in the intermediate portion of the sliding tube section 20, at an interval therefrom in the circumferential direction.

An discharge hole 27 is formed in the middle portion of the lid main body 21 and a cylinder 28 extending in an upwards direction is formed integrally with this discharge hole 27. A virgin film 29 which closes off the discharge hole 27 is arranged to the lower face of the lid main body 21, and in use, the virgin film 29 is cut open, a nozzle (not illustrated) is fixed to the cylinder 28, and the highly viscous material 4 is caused to be discharged from the nozzle.

The outer diameter of the vertical wall section 12a of the bottom plate member 12 is formed to a smaller diameter than the inner diameter of the ring member 11, thereby achieving a composition wherein the lower portion of the sliding tube section 20 is inserted up to the intermediate portion of the ring member 11 when the lid member 3 is interlocked with the ring member 11, and furthermore, a composition is achieved wherein the bottom plate member 12 integrates inside the ring member 11, as illustrated by the dotted lines in FIG. 3, so that all of the highly viscous material 4 charged in the flexible container 2 can be squeezed up completely, in a state where the cylindrical member 10 is crushed to a small size after squeezing up the highly viscous material 4. However, it is also possible to adopt a composition wherein, if the lower end of the sliding tube section 20 projects below the ring member 11 when the lid member 3 has been plugged onto the ring member 11, then the bottom plate member 12 is arranged fused-bonding to a cylindrical member 102 in such a manner that the vertical wall section 12a projects on the upper side thereof, the inner diameter of the vertical wall section 12a being formed slightly larger than the outer diameter of the sliding tube section 20, whereby the highly viscous material 4 charged in the flexible container 2 can be squeezed up completely when the bottom plate member 12 is integrated over the sliding tube section 20.

Next, a modification example is described wherein the composition of the flexible container 2 is partially modified.

(1) In order to increase the airtightness and bonding strength between the cylindrical member 10 and the ring member 11, it is also possible to form one or a plurality of fuse-bonding sections consisting of circumference grooves and circumference projections in the fused-bonding section between these members. In this case, a tensile force is imparted in a circumferential direction on the cylindrical member 10 by means of the circumference grooves and the circumference projections, and by fused-bonding the cylindrical member 10 and ring member 11 together in a state where no distortion of the cylindrical member 10 is caused, it is possible to obtain satisfactory the airtightness and prevent fused-bonding faults due to wrinkling.

Figure 6:
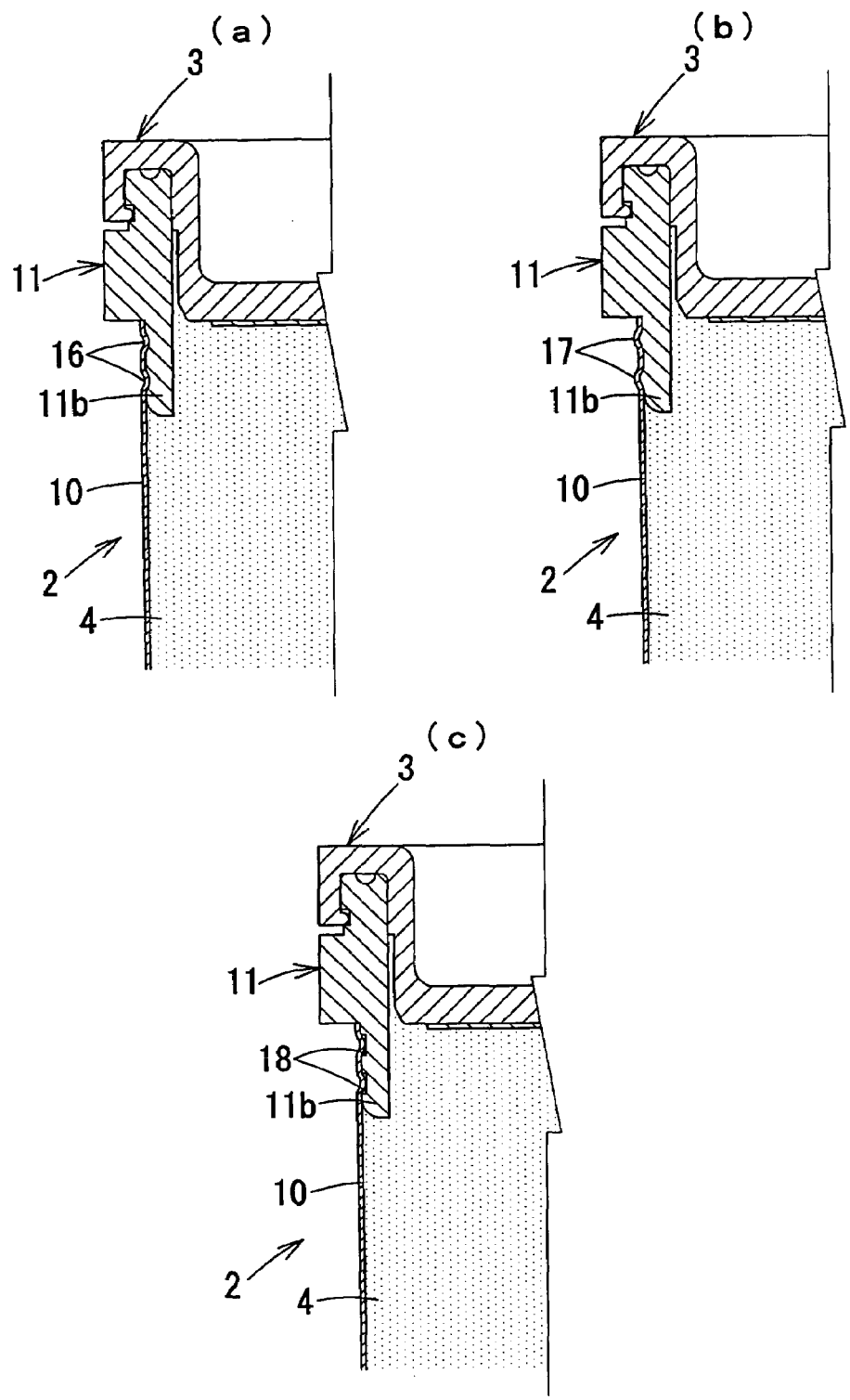
FIGS. 6(a) to (c) are principal vertical sectional views of a seal structure between a ring member and a cylindrical member, according to a further composition.

More specifically, as shown in FIGS. 6(a) and (b), when the ring member 11 and the cylindrical member 10 are fused-bonding by heat, a heating plate 42 having a heating face 41 formed with projection strips 43 and grooves corresponding to the circumference grooves 16 and the circumference projections 17 is used, as illustrated by the fusing means 40 described hereinafter (see FIG. 12), and by applying this heating plate 42 under pressure, the cylindrical member 10 and the ring member 11 are fused-bonding together, and furthermore, the cylindrical member 10 and the ring member 11 melt and deform due to the heat during fused-bonding the circumference grooves 16 and the circumference projections 17 are formed by heat for fused-bonding, whilst tensile force is imparted to the cylindrical member 10.

By previously forming the circumference grooves 18 on the outer circumference of the ring member 11, as shown in FIG. 6(c), and inserting the cylindrical member 10 into these circumference grooves 18, the upper and the lower sides of the circumference grooves 18 become fitted tightly to the cylindrical member 10, and this fixed section can be fused-bonding by heat bonding, or the like. Moreover, it is also possible to previously form the circumference projections on the outer circumference of the ring member 11, setting the outer diameter of the apex portion of these circumference projections to a size which is slightly larger than the inner diameter of the upper end portion of the cylindrical member 10, and by pressing the position on the cylindrical member 10 corresponding to either both sides or one side of the circumference projections, in an inward radial direction, it is possible to fuse-bonding the cylindrical member 10 tightly to the circumference projections and then achieve this tightly fuse-bonding section by heat bonding, or the like.

Figure 7:
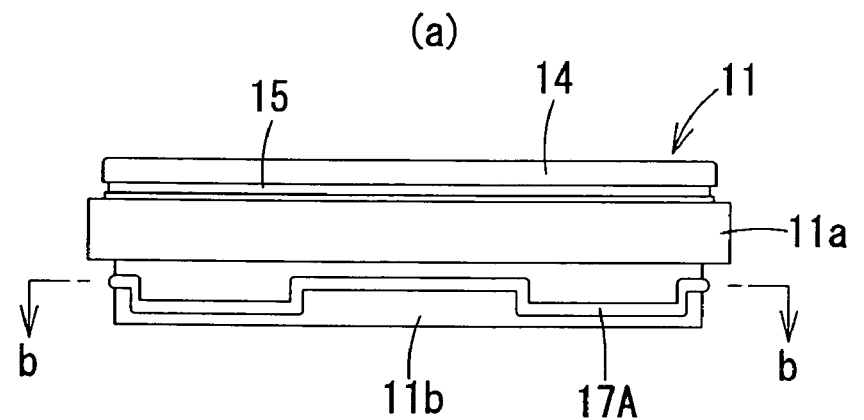
FIG. 7 shows a further fitting structure, (a) being a side view of a ring member and (b) being a sectional view along line b-b in (a)
Figure 7:
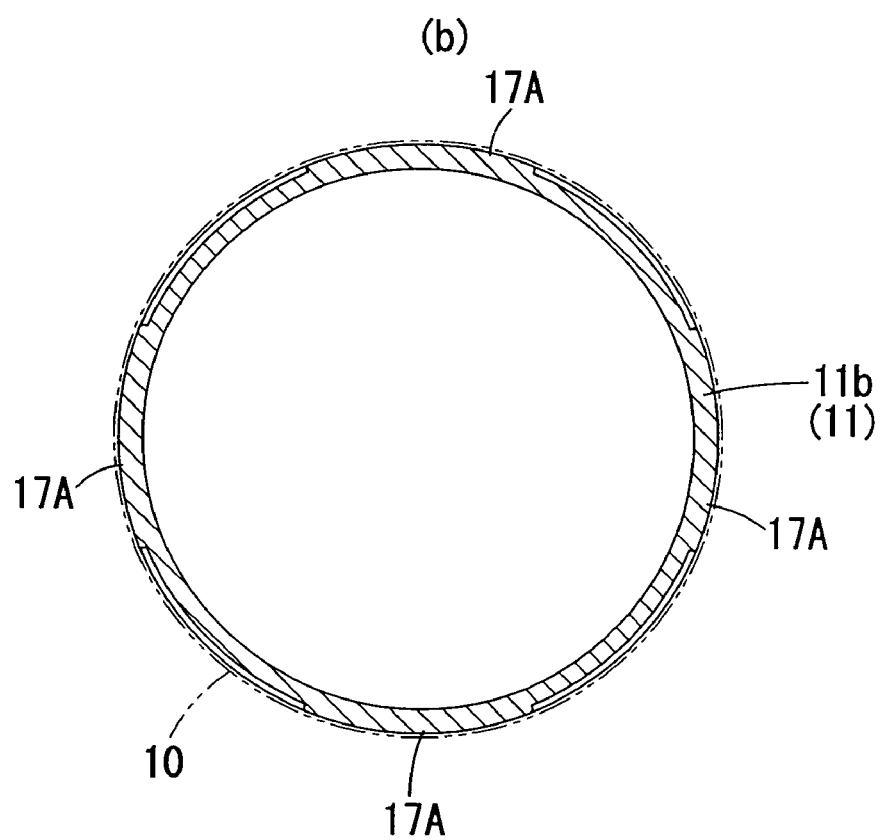

Moreover, if a circumference projection is previously formed, then desirably, a square wave circumference projection 17A, for example, which oscillates in the axial direction of the ring member 11 is formed on the outer face of the small diameter section 11b of the ring member 11, as shown in FIG. 7(a). In this case, when inserting the end section of the cylindrical member 10 into the lower end portion of the circumference projections 17A in order to fit the cylindrical member 10 to the small diameter section 11b, since the cylindrical member 10 fits onto the circumference projection 17A formed intermittently in the circumferential direction, as illustrated in FIG. 7(b), the cylindrical member 10 is loose relatively in between the adjacent circumference projections 17A, and moreover, since the same action occurs when the end portion of the circumference member 10 is fitted to the upper portion thereof, it is possible to raise the integration of the cylindrical member 10 with respect to the small diameter section 11b of the ring member 11, and furthermore, by fused-bonding in the direction of the circumference projections 17A, it is possible to achieve a fused-bonding about the full circumference. Instead of the circumference projections 17A, it is also possible to adopt circumference projections of any waveform, such as a triangular waveform, sine-curved waveform, saw-teeth waveform, or the like. Moreover, in FIG. 7(a), the portion of the circumference projections 17A extending in the axial direction is omitted, but it is also possible form projections intermittently in the upper portion and the lower portion of the small diameter section 11b. In this case, desirably, the upper and the lower projections are provided in such a manner that the intermittent sections do not overlap in the upward and the downward direction.

Desirably, one or a plurality of fused-bonding sections are formed in a similar manner to the foregoing, in the airtightness between the bottom plate member 12 and the cylindrical member 10.

(2) In order to ensure adequate airtightness between the ring member 11 and the lid member 3, it is also possible to adopt the following composition for the ring member 11 and the lid member 3.

Figure 8:
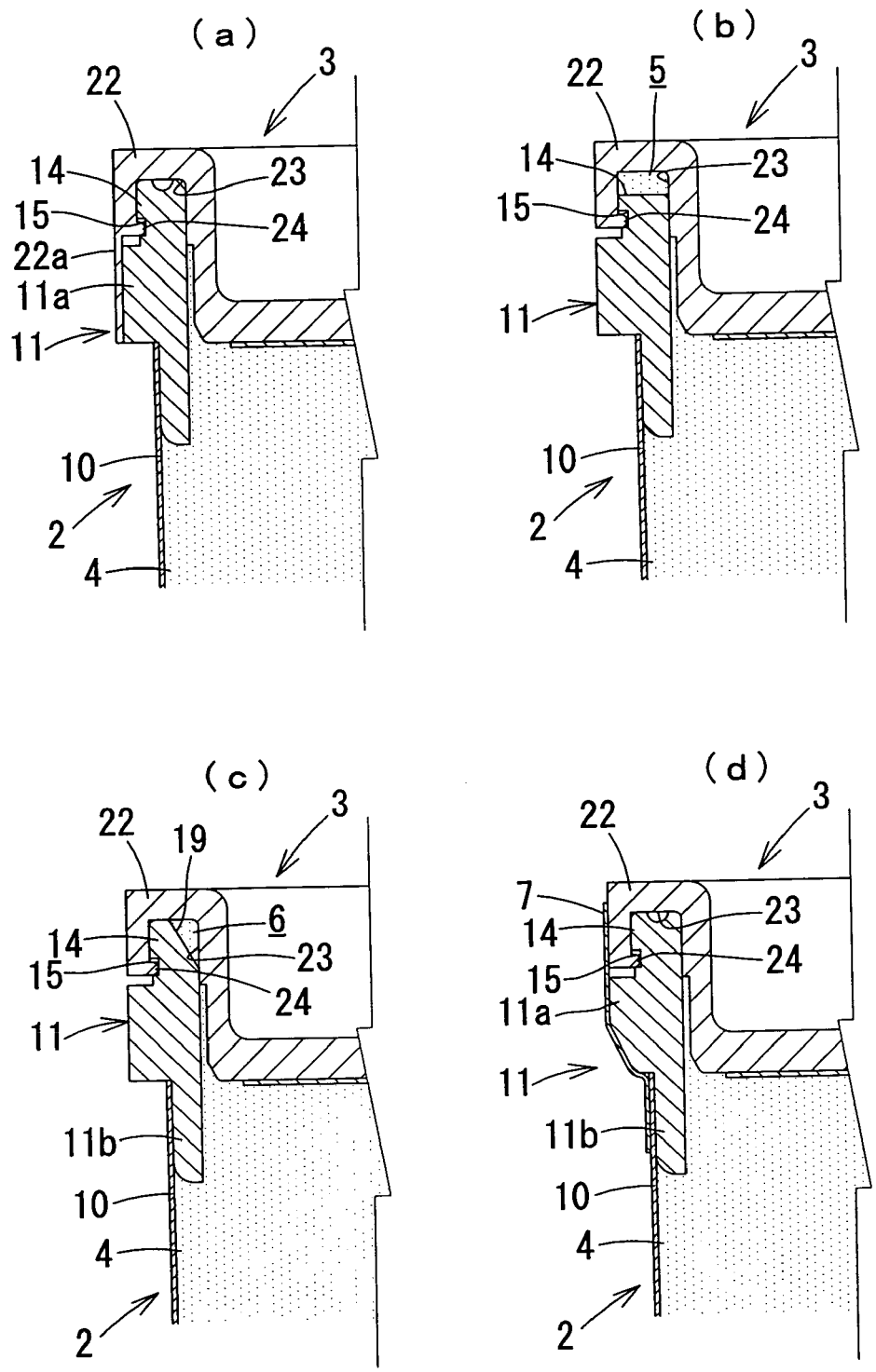
FIGS. 8(a)-(d) are principal vertical sectional views of a seal structure between a ring member and a lid member according to a further composition.

As illustrated in FIG. 8(a), it is also possible for a thin, cylindrical fused-bonding section 11a extending downwards to be formed on the collar section 22, following the outer circumference of the large diameter section 11a of the ring member 11, and for this fused-bonding section 22a to be fused-bonding to the large diameter section 11a. For the fused-bonding method, it is possible to use heat bonding, ultrasonic bonding, high-frequency induction bonding, or the like.

Moreover, it is also possible to apply a sealant, such as an adhesive or tackiness agent, onto the interface section 14 of the ring member 11 and/or the inside of the circumference groove 23 of the lid member 3, in order that the ring member 11 and the lid member 3 are bonded airtightly, and if the highly viscous material 4 is an adhesive sealant, tackiness agent, or the like, then it is possible for the highly viscous material 4 to be applied in such a manner that highly viscous material 4 becomes situated between the interface section 14 of the ring member 11 and the circumference grooves 23 of the lid member 3, or inside the circumference grooves 11e, whereby the highly viscous material 4 can function as a sealant. In this case, it is possible to omit the step of the fused-bonding, or it is possible to raise the airtightness further by combining it with the fused-bonding.

Furthermore, it is also possible to adopt a composition, as illustrated in FIG. 8(b), wherein the circumference grooves 11e are omitted, and a circumference space 5 is formed between the upper end portion of the ring member 11 and the far end face of the circumference groove 23, when the projection 24 of the lid member 3 is interlocked with the fitting groove 15 of the ring member 11, in such a manner that seal agent is filled into this circumference space 5. Moreover, as shown in FIG. 8(c), it is also possible to adopt a composition wherein a circumference slant section 19 is formed on in the upper end portion of the ring member 11, and a circumference space 6 is formed inside the circumference groove 23, in such a manner that seal agent is filled into this circumference space 6. In this case, desirably, the lid member 3 can be inserted easily in position with respect to the ring member 11.

As a seal agent, it is possible to use a single-component curing composition, based on polyurethane, silicone, modified silicone, modified polysulphide, acrylic, butyl rubber, SBR, fluorine, acrylic silicone, and the like. Moreover, it is also possible to increase the airtightness by applying a gasket made from packing, a sealing ring, or the like, to the fitting section between the ring member 11 and the lid member 3. As a gasket, it is possible to use a rubber gasket, or a paste composition may also be used in place. In this case, a thermoplastic hot melt composition forming the paste composition is applied onto the inside of the circumference groove 23 in a heated and melted state, and the lid member 3 is then plugged onto the ring member 11, whereupon the thermoplastic hot melt composition cools, solidifies and expands, thereby achieving the airtightness.

Moreover, as illustrated in FIG. 8(d), it is also possible for addhesive tape 7 to be bound about the lid member 3 and the ring member 11, thereby causing the fitting sections of the two members to be bonded airtightly. Furthermore, it is also possible for the fitting sections of the lid member 3 and the ring member 11 to be bonded airtightly, by combining heat bonding, a sealing agent, and adhesive tape 7.

Next, the method of manufacturing the flexible container 2 will be described.

Figure 9:
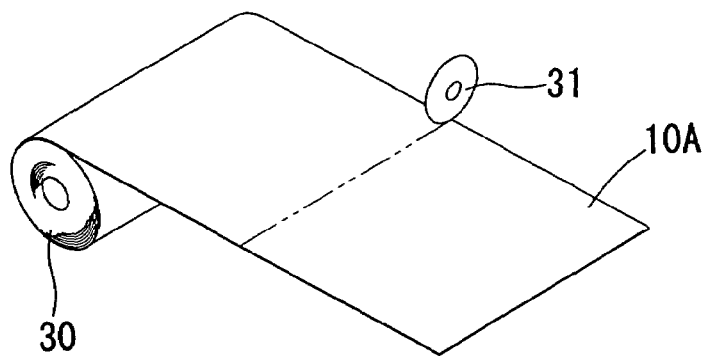
FIG. 9 is an explanatory diagram of a method of manufacturing a flexible container.
Figure 9:
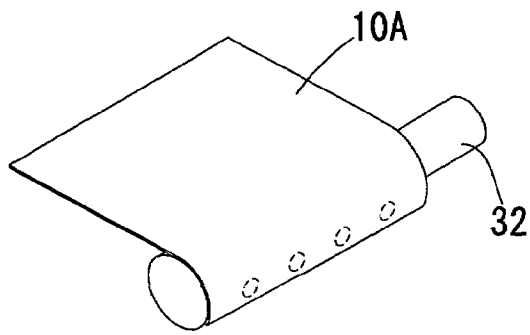
Figure 9:
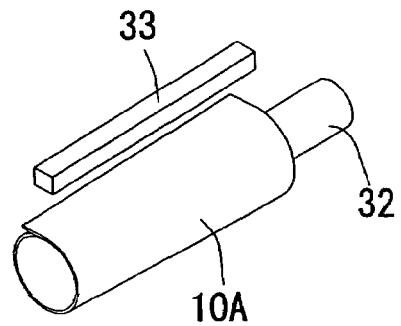
Figure 9:
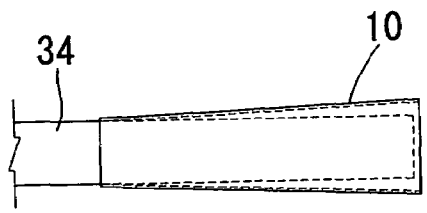

Firstly, as shown in FIG. 9(a), a flexible film 10A is extracted from a thick roll 30, by means of a suction pad, or the like, and the flexible film 10A is then cut to a prescribed length by a cutter 31.

Thereupon, as shown in FIG. 9(b), the end section of the flexible film 10A is suctioned and held on a mandrel 32 having a slightly tapered circumference corresponding to the cylindrical member 10, and the mandrel 32 is rotated, causing the flexible film 10A to be wound about the mandrel 32.

Thereupon, as shown in FIG. 9(c), both edges of the flexible film 10A wound about the mandrel 32 are overlapped on each other and then fused-bonding by a heating rod 33, to fabricate an approximately tapered cylindrical member 10. The fabricated cylindrical member 10 is formed with a tapered cylindrical shape which decreases slightly in diameter towards one end thereof, in such a manner that it can be removed readily from the mandrel 32. Moreover, the ring member 11 and the bottom plate member 12 are previously fabricated by means of injection moulding, or the like. The ring member 11 and the bottom plate member 12 can be fabricated in the manufacturing line for the flexible container 2, but it is desirable in terms of equipment costs if they are fabricated previously by an exclusive injection moulding line, as this makes it possible to simplify the composition of the manufacturing line.

Thereupon, as illustrated in FIG. 9(d), the cylindrical member 10 is transferred from the mandrel 32 to the conveyor core 34. The cylindrical member 10 is transferred on a conveyor core 34 in such a manner that the larger diameter side of the cylindrical member 10 is positioned to the front end side of the conveyor core 34.

Figure 10:
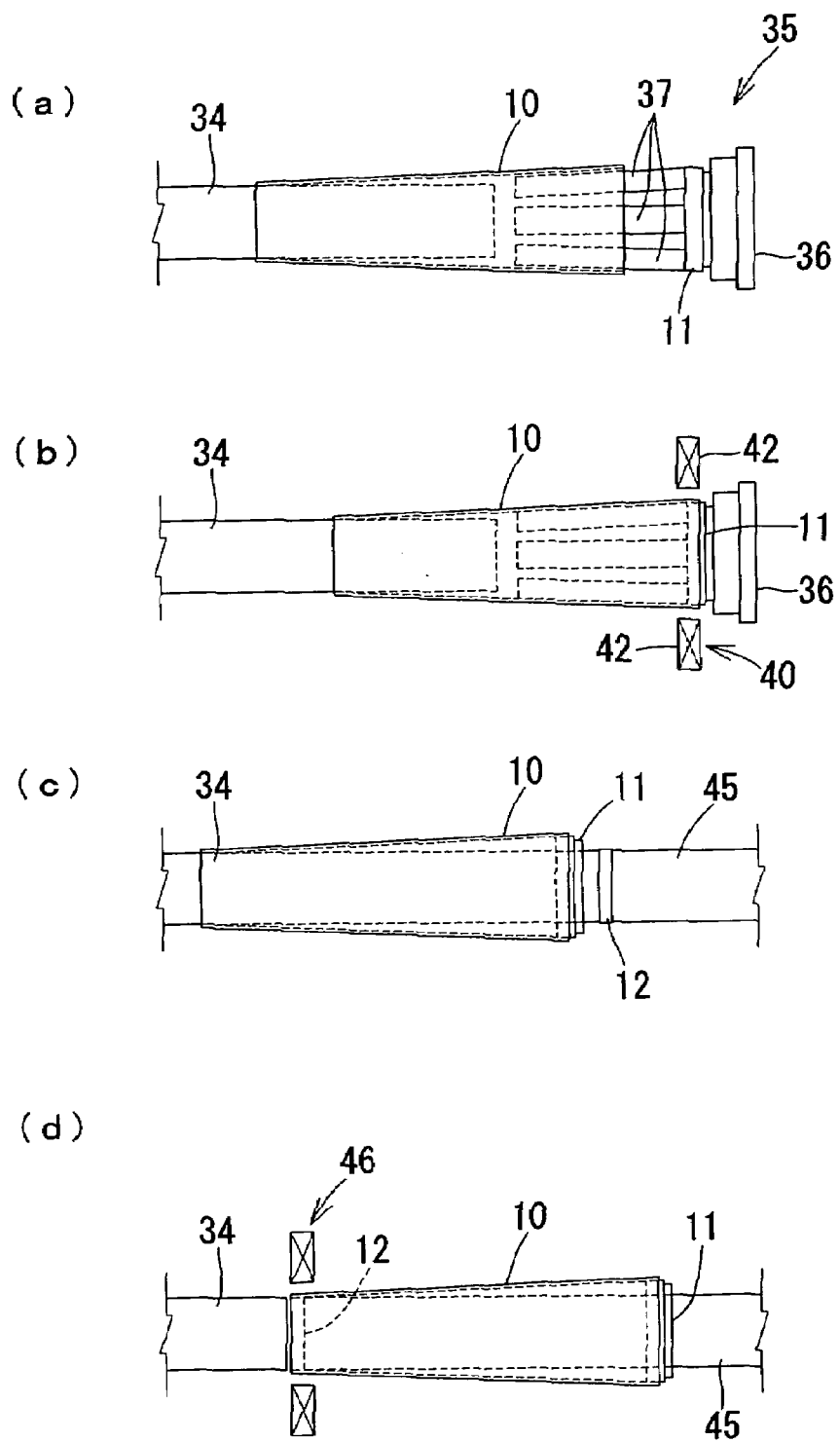
FIG. 10 is an explanatory diagram of a method of manufacturing a flexible container.

Next, as illustrated in FIG. 10(a), a ring member 11 is inserted into the front end portion of the cylindrical member 10. In this case, inserting guide means 35 having the following composition is used in order to guide the front end portion of the cylindrical member 10.

Figure 11:
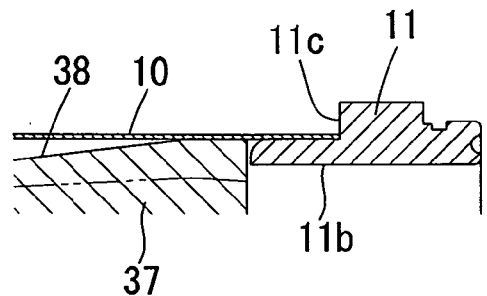
FIG. 11 is a principal vertical sectional view of the region of a ring member when a cylindrical member is inserted into a ring member.

In the inserting guide means 35, as illustrated in FIG. 10(a) and FIG. 11, a plurality of guide members 37 which are expandable and compressible in the radial direction by means of driving means (not illustrated), are provided on the left-hand side of an approximately circular disc-shaped member 36, an inserting guide face 38 is formed on the outer face of each of the plurality of guide members 37 in such a manner that coincides with the inner face of the cylindrical member 10 when in an expanded state, and a holding tube (not illustrated) which is capable of holding the ring member 11 from the inner side is formed between the guide members 37 and the disc-shaped member 36.

When inserting the ring member 11 onto the cylindrical member 10, as shown in FIG. 10(a), the ring member 11 is inserted onto the holding tube section of the inserting guide means 35, the plurality of guide members 37 are caused to expand, and the inserting guide means 35 and conveyor core 34 are caused to butt together in an approximately coaxial fashion, whereupon, by relative movement of the cylindrical member 10 and the inserting guide means 35 in this state, the front end section of the cylindrical member 10 is guided by the inserting guide faces 38 of the guide members 37, as illustrated in FIG. 11, and is fitted over the small diameter section 11b of the ring member 11. By guiding the front end portion of the cylindrical member 10 by inserting guide means 35 of this kind, the process of inserting the ring member 11 onto the cylindrical member 10 can be completed smoothly.

Thereupon, the cylindrical member 10 is fused-bonding and fixed airtightly to the ring member 11, by fuse-bonding means 40, such as heat bonding, ultrasonic bonding, high-frequency induction bonding, or the like.

Here, a case where heat bonding is used for fuse-bonding and fixing will be described.

Figure 12:
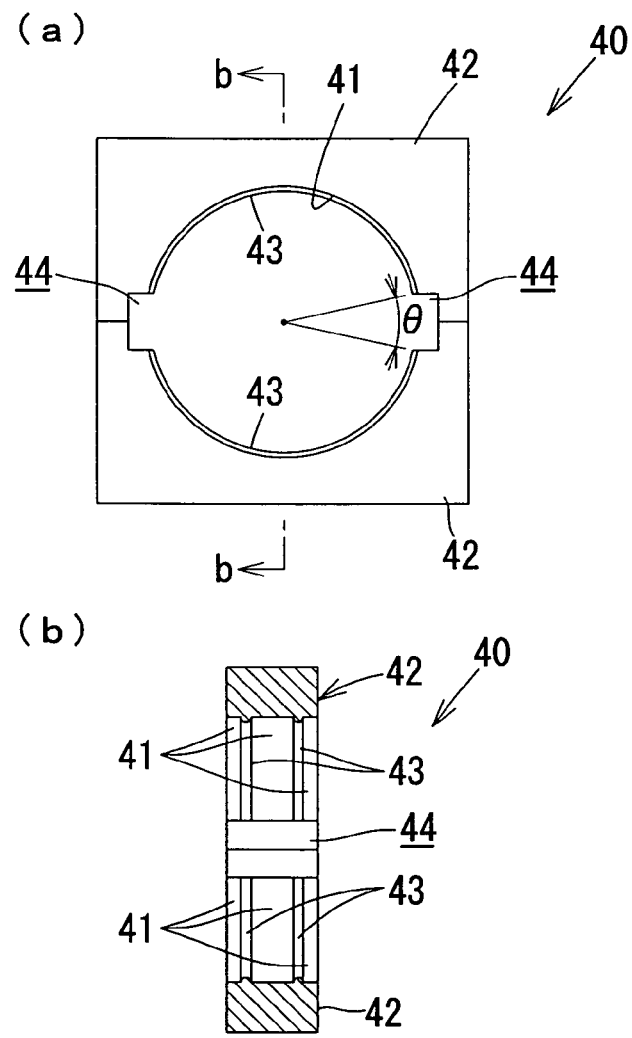
FIG. 12(a) is a front view of a heating plate.
FIG. 12(b) is a sectional view along line b-b in (a)

Firstly, in the fuse-bonding means 40, as illustrated in FIG. 12, a pair of heating plates 42, formed with semicircular heating faces 41 having approximately the same circumference or a slightly smaller circumference than the outer circumference of the ring member 11, are provided, and a pair of projection parts 43 are formed along the whole length of the heating faces 41, at an interval in the axial direction. Moreover, by partially cutting away the heating plates 42 at both ends of the heating faces 41, non-heating gaps 44 which do not make tight contact with the cylindrical member 10 are formed in a range of 20-30° of the central angel of the semicircular heating faces 41, when the two heating plates 42 are assembled together. If these non-heating gaps 44 are formed to a range of less than 20°, then the slackening of the cylindrical member 10 will become too concentrated, large wrinkles will occur in the second heat bonding process, and airtightness may decrease, the other side, if the range exceeds 30°, then it is not possible to act sufficient tensile force on the cylindrical member 10 in the circumferential direction, and hence, desirably, this range is set to 20-30°. moreover, the shape, height and number of the projection parts 43 can be set optionally.

When fused-bonding the cylindrical member 10 to the ring member 11 using this fuse-bonding means 40, the front end portion of the cylindrical member 10 is fitted over the small diameter section 11b of the ring member 11, the heating faces 41 of the pair of heating plates 42 are placed against this fuse-bonding section, and the cylindrical member 10 and the ring member 11 are thereby fused-bonding together, but even if some degree of slackening occurs in the cylindrical member 10 during this, this slackening will tend towards the side of the non-heating gaps 44, since the cylindrical member 10 is pulled in the circumferential direction by both end portions of the heating faces 41, and moreover, since the outer face of the ring member 11 melts, and the cylindrical member 10 adopts a form following the projection parts 43, and a tensile force acts on the cylindrical member 10 in the axial direction and circumferential direction, thereby eliminating the slackening, it is possible to fuse-bonding the cylindrical member 10 and ring member 11 together airtightly.

Thereupon, in order to fuse-bonding the portions corresponding to the non-heating gaps 44, the cylindrical member 10 and the ring member 11 are rotated through approximately 90°, whereupon the fitted portion of the cylindrical member 10 and the ring member 11 is heat bonded by the pair of heating plates 42, similarly to the foregoing, thereby fuse-bonding airtightly the members together. Slackening occurs in the portion of the cylindrical member 10 corresponding to the non-heating gaps 44 formed in the first heat bonding process, but since these non-heating gaps 44 are formed to a relatively large size, the slackening is prevented from being concentrated in one point, and although in some cases a degree of wrinkling may be caused by this slackening, satisfactory airtightness is ensured.

After fuse-bonding the cylindrical member 10 and the ring member 11 together in this way, the guide members 37 are compressed to a smaller diameter than the inner diameter of the ring member 11, as indicated by the dotted lines in FIG. 11, and the process is removed from the inserted guide means 35 and transported by the conveyor core 34. Incidentally, the process of fuse-bonding the cylindrical member 10 and the ring member 11 may be carried out at a station other than the inserting guide means 35.

Thereupon, as shown in FIG. 10(c), a seal core 45 is butted against the front end section of the conveyor core 34, the bottom plate member 12 being held therebetween, and the cylindrical member 10 and the bottom plate member 12 are caused to move relative to each other in the axial direction, whereby the bottom plate member 12 passes through the ring member 11 and is inserted at the first end of the cylindrical member 10, as shown in FIG. 10(d), thereby fitting the bottom plate member 12 to the cylindrical member 10.

Thereupon, as illustrated in FIG. 10(d), the cylindrical member 10 is fused-bonding and fitted to the bottom plate member 12 airtightly by means of fuse-bonding means 46, such as heat bonding, ultrasonic bonding, high-frequency induction bonding, or the like, similarly to the ring member 11, thereby manufacturing a flexible container 2. Fuse-bonding means 46 may adopt a similar composition to fuse-bonding means 40.

Next, another method of manufacturing a flexible container 2 will be described.

Figure 13:
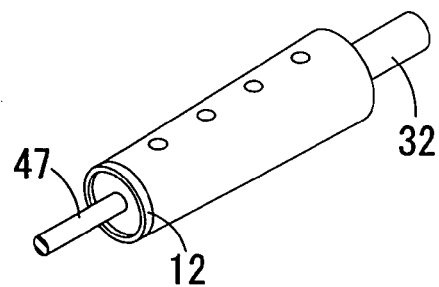
FIG. 13 is an explanatory diagram of a further method of manufacturing a flexible container.
Figure 13:
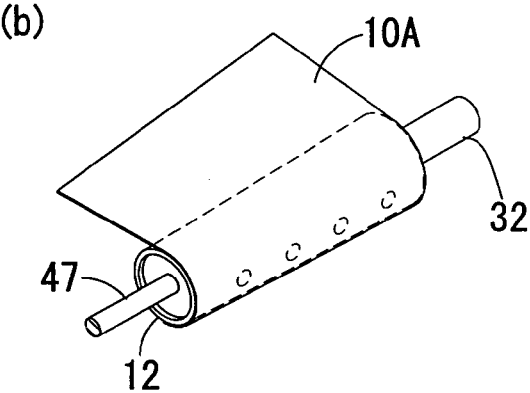
Figure 13:
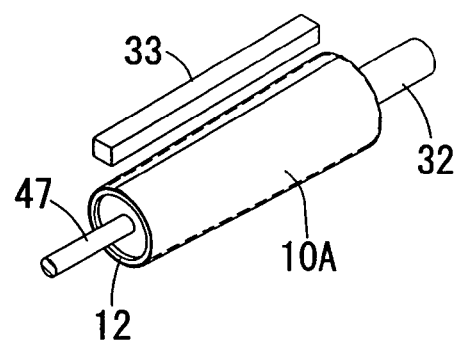
Figure 13:
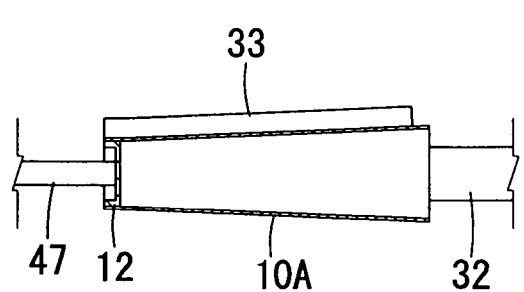

(1) As shown in FIG. 13(a), a bottom plate member 12 is fixed to the front end section of a mandrel 32 using a pressing rod 47, and in this state, a flexible film 10A is wound about the mandrel 32, as illustrated in FIG. 13(b). Thereupon, as shown in FIG. 13(c), both edges of the flexible film 10A wound about the mandrel 32 are overlapped on each other and fused-bonding by a heating rod 33, and the end portion of the flexible film 10A is fused-bonding to the bottom plate member 12 using fusing means 40 (not illustrated) similar to the foregoing. In this way, an approximately cylindrical member 10 having a bottom plate member 12 is fabricated, and by removing this from the mandrel 32, fitting a ring member 11 to the inner side of the opposite end of the cylindrical member 10 and then fuse-bonding by fuse-bonding means 40, a flexible container 2 is obtained. When fuse-bonding the overlapping portion of the flexible film 10A by means of a heating rod 33, it is possible to not fuse-bonding the side (right end side) on which the ring member 11 is fitted, and to increase the integration of the ring member 11 onto the end section of the cylindrical member 10. Moreover, similarly to the embodiment illustrated in FIG. 9(c), it is also possible to not fuse-bonding the overlapping section of the flexible film 10A at the end (larger diameter end) at which the ring member 11 is to be installed.

Figure 14:
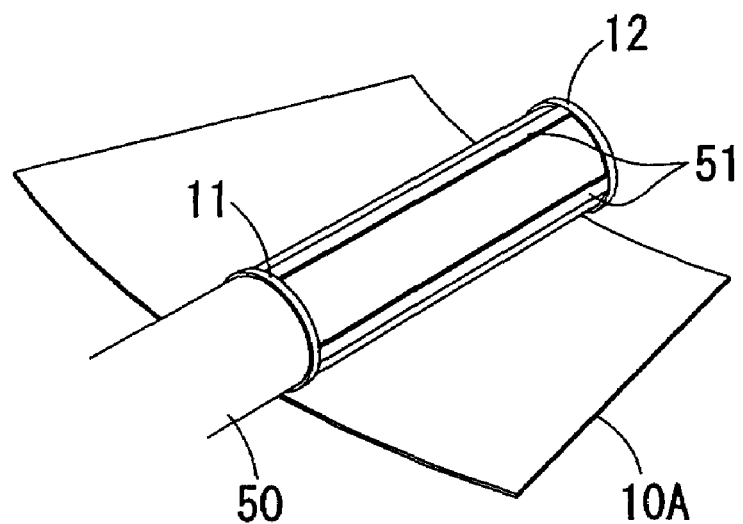
FIG. 14 is an explanatory diagram of a further method for manufacturing a flexible container.
Figure 14:
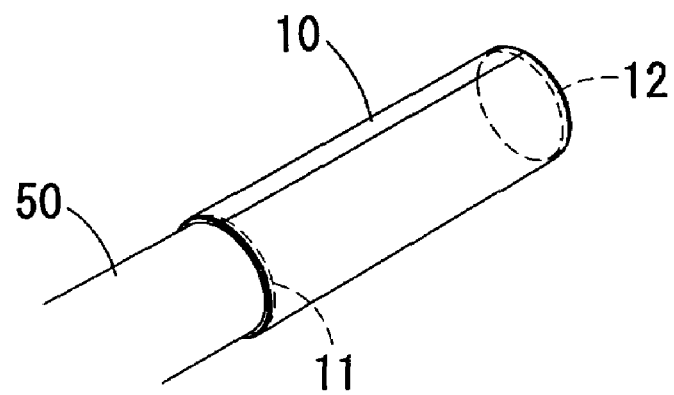

(2) As shown in FIG. 14(a), it is also possible to fabricate a flexible container 2 by a method wherein a ring member 11 is fitted over the end portion of an approximately cylindrical mandrel 50, a bottom plate member 12 is fitted over the front end section thereof, and in this state, a flexible film 10A is wound about the mandrel 50, whereupon, as shown in FIG. 14(b), the overlapping section of the flexible film 10A is fused and fitted airtightly by heat bonding, ultrasonic bonding, high-frequency induction bonding, or the like, and furthermore, both end sections of the flexible film 10A rolled into a cylindrical shape are respectively fused-bonding and fixed airtightly to the bottom plate member 12 and the ring member 11. In this case, a receiving member 51 is provided in a withdrawable fashion on the mandrel 50, and when the overlapping portion of the flexible film 10A is fused-bonding, this receiving member 51 is made to project and receive and hold the flexible film 10A from behind, whereas when the flexible container 2 is removed from the mandrel 50, the receiving member 51 is withdrawn so as to prevent interference between the receiving member 51 and the ring member 11. Moreover, desirably, a composition is adopted wherein a plurality of receiving members 51 are provided, in such a manner that the rolled flexible film 10A is maintained in a cylindrical shape.

Next, the method of charging highly viscous material 4 into the flexible container 2 is described.

As shown in FIG. 15(a), the flexible container 2 is placed in a vertical position, a highly viscous material feeding tube 55 is inserted inside the flexible container 2 to the far end thereof, and in this state, the flexible container 2 is caused to descend in relation to the highly viscous material feeding tube 55 whilst highly viscous material 4 is fed from the highly viscous material feeding tube 55, thereby feeding a required volume of highly viscous material 4 into the flexible container 2 in a manner which prevent air bubbles from mixing into the highly viscous material 4. When the highly viscous material 4 has been charged, as shown in FIG. 15(b), the surface of the highly viscous material 4 forms a mounded shape having an apex portion thereof, due to the high viscosity of the highly viscous material 4.

Next, as shown in FIG. 15(c), the intermediate portion of the cylindrical member 10 of the flexible container 2 charged with highly viscous material 4 is pressed by a pressing member (not illustrated), thereby causing the surface of the highly viscous material 4 to rise upwards, and thereby adjusting the apparent amount of highly viscous material 4 charged into the container to a higher amount. In this case, when the surface of the highly viscous material 4 is caused to rise upwards, it generally maintains the mounded shape created upon charging.

Figure 15:
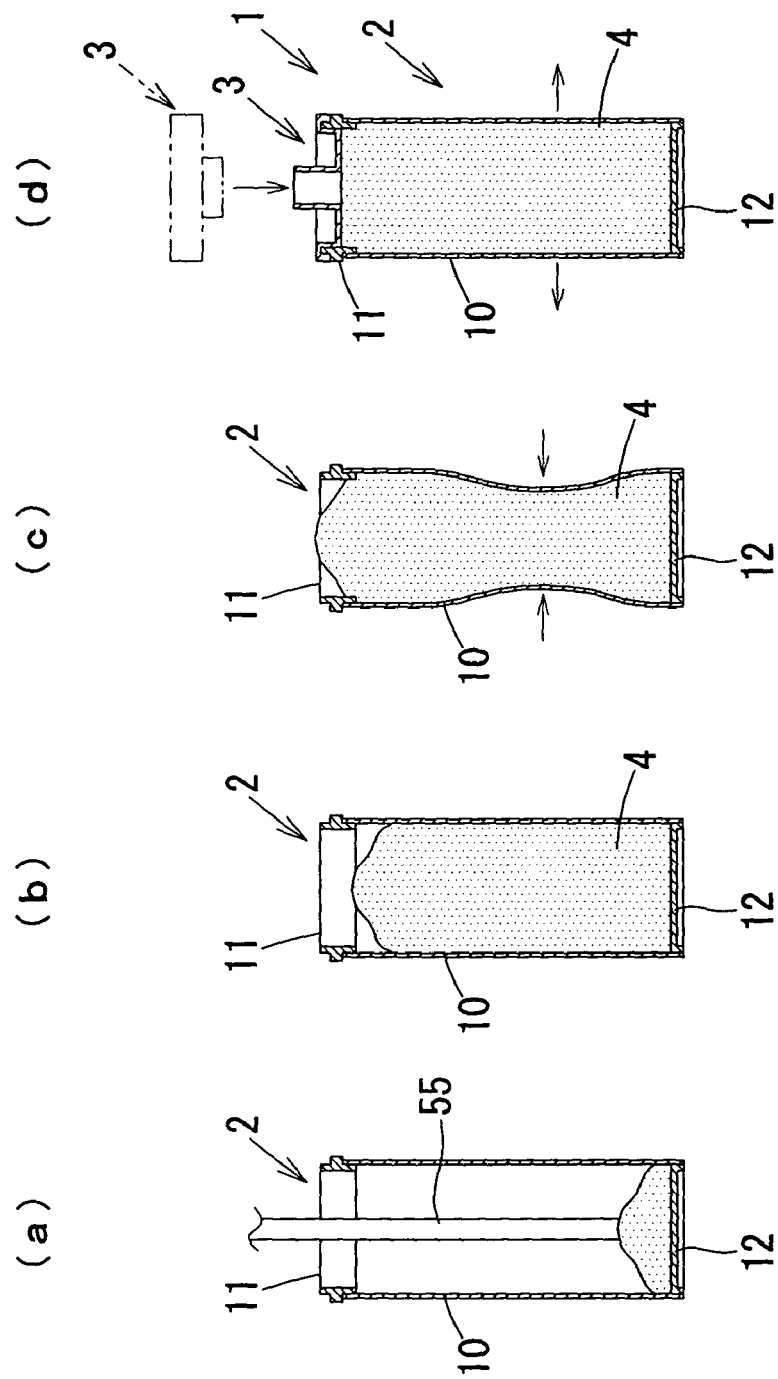
FIG. 15 is an explanatory diagram of a method of charging a highly viscous material into a flexible container.
Figure 16:
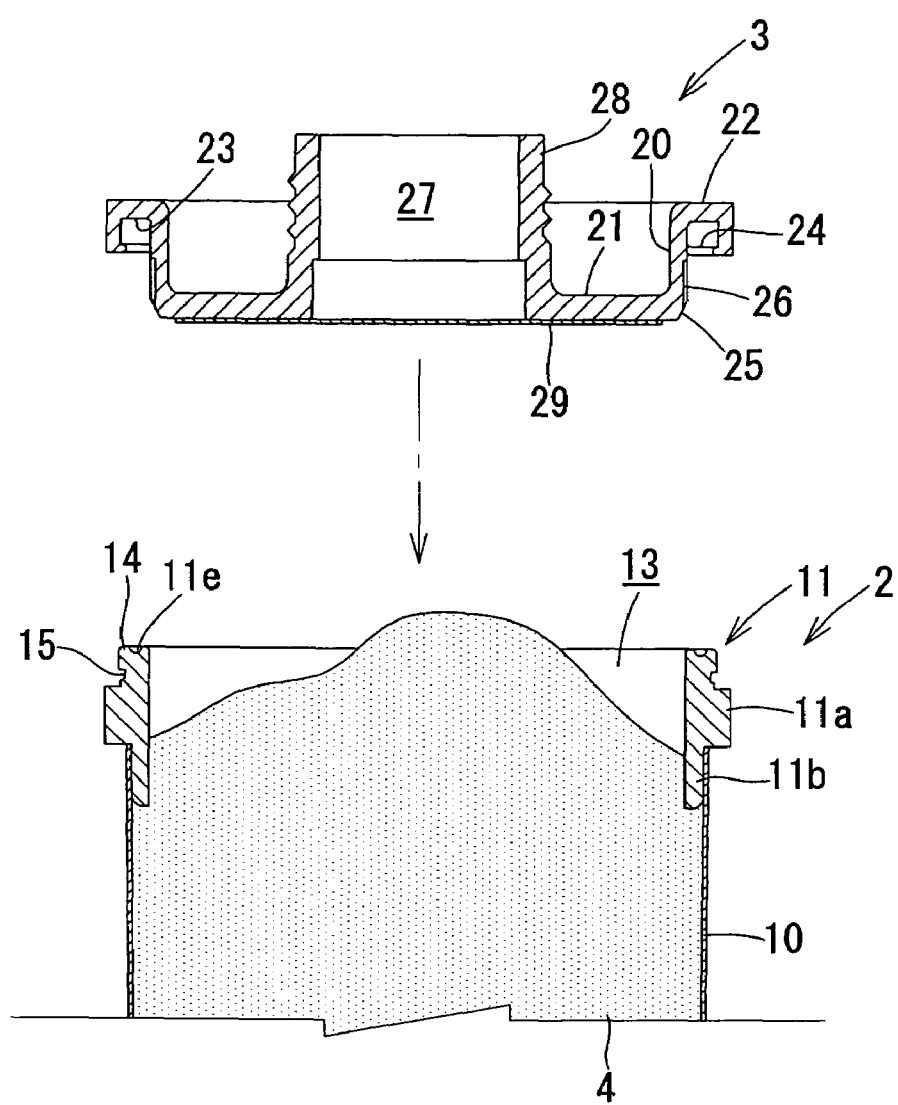
FIG. 16 is an explanatory diagram of a state prior to the plugging of a lid member into a flexible container.
Figure 17:
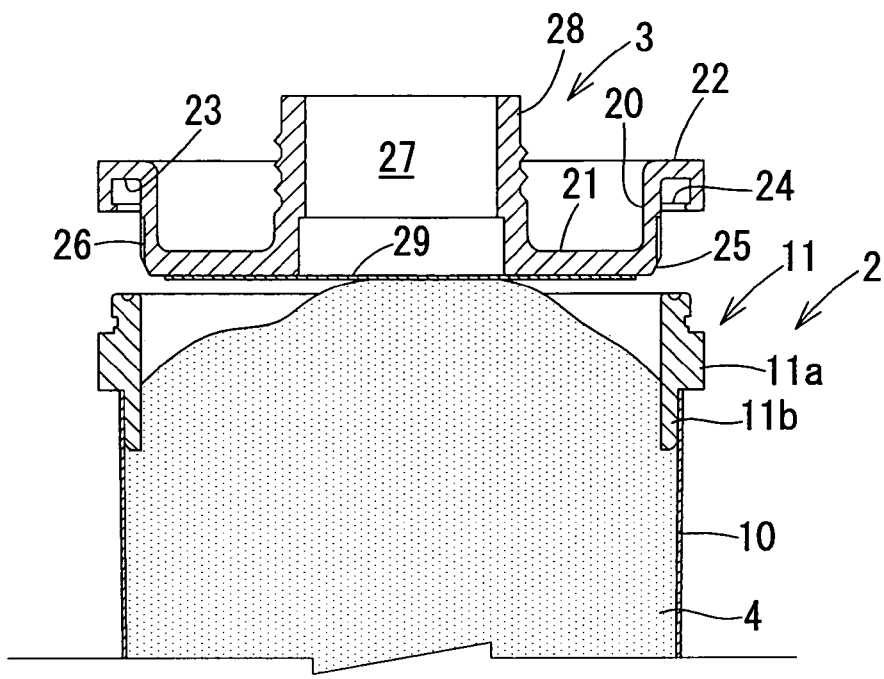
FIG. 17 is an explanatory diagram of a state during plugging of a lid member into a flexible container.
Figure 18:
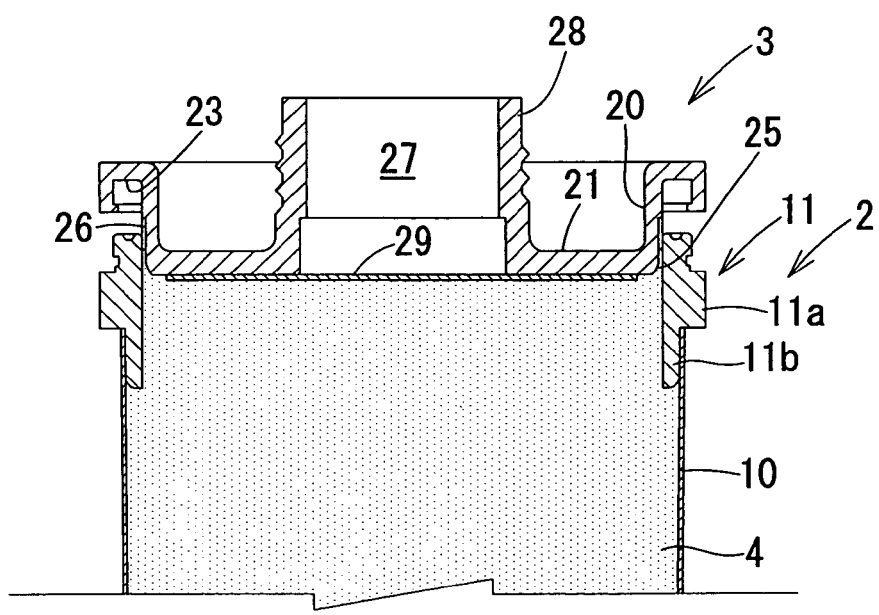
FIG. 18 is an explanatory diagram of a state during plugging of a lid member into a flexible container.
Figure 19:
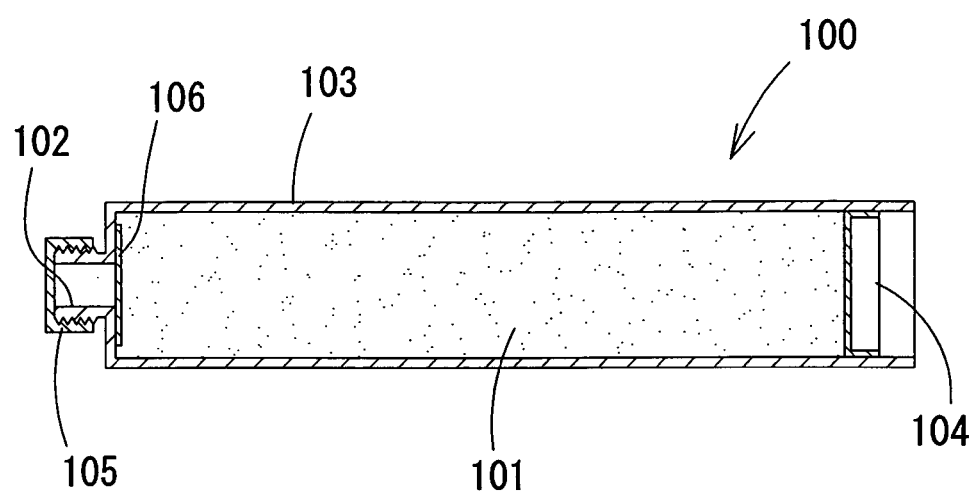
FIG. 19 is a vertical sectional diagram of a charged container relating to the prior art.

Thereupon, the pressure imparted by the pressing member is released and free admittance, the lid member 3 is butted on its under side against plugging means (not illustrated), and as shown in FIG. 15(*d*) and FIG. 16, the sliding tube section 20 of the lid member 3 is inserted into the ring member 11 of the flexible container 2, whilst the cylindrical member 10 is allowed to return to its original shape. However, in this case, since the lid member 3 first contacts tightly against the apex of the surface of the highly viscous material 4 as shown in FIG. 17, and then contacts tightly against the surface of the highly viscous material 4 whilst squashing the apex thereof, in other words, whilst extending the region of contact between the surface of the highly viscous material and the lid member 3 in an outward circumferential direction, air is expelled from between the lid member 3 and the surface of the highly viscous material 4, and when the lid member 3 starts to be plugged into the ring member 111, this air is expelled almost completely to the exterior by means of the gas expulsion groove section 26, and hence the lid member 3 is plugged into the ring member 11 as illustrated in FIG. 18. Even if the pressing of the cylindrical member 10 by the pressing member is not released, since the cylindrical member 10 is made of a flexible film, it is possible to plugge the lid member 3 with a greater force than the pressing force of the pressing member.

Furthermore, in this case, the lid member 3 is plugged into the ring member 11, the interface section 14 of the ring member 11 is fixed into the circumference groove 23 of the lid member 3, and the projection 24 of the lid member 3 is fitted into the fitting groove 15 of the ring member 11.

By fuse-bonding the outer circumference of the lid member 3 to the ring member 11 by means of the fuse-bonding equipment after having plugged in the lid member 3 in this way, the lid member 3 is fitted airtightly to the ring member 11. Incidentally, if the lid member 3 and the ring member 11 are bonded airtightly by a seal agent, such as an adhesive or tackiness agent, or the like, then this seal agent is previously applied onto the inside of the circumference groove 23 of the lid member 3 and/or the interface section 14 of the ring member 11. Moreover, if the lid member 3 and the ring member 11 are bonding airtightly by means of the highly viscous material 4, then the pressure applied to the cylindrical member 10 is set to a large force in such a manner that the highly viscous material 4 is caused to enter into the interface portion 14 of the lid member 3 and the ring member 11. Furthermore, if airtightness by means of adhesive tape 7, then the adhesive tape 7 is attached about the lid member 3 and the ring member 11.

In a highly viscous material charged container 1 wherein highly viscous material 4 is charged into a flexible container 2 and then the flexible container is plugged in this way, it is possible effectively to expel the air remaining in the place between the lid member 3 and the surface of the highly viscous material 4, so that it is possible effectively to prevent degradation and curing of the highly viscous material 4 by the remaining air. Moreover, since an airtightness is achieved reliably by means of fuse-bonding the lid member 3 and the ring member 11, or, in addition, by means of a seal agent, gasket or adhesive tape 7, it is possible effectively to prevent curing and deterioration of the highly viscous material 4 due to infiltration of external air via small gaps between the lid member 3 and the ring member 11. For example, even if a sealant made from a composition which cures with moisture in air is charged in as the highly viscous material 4, infiltration of moisture into the flexible container 2 is reliably prevented, and hence curing of the highly viscous material 4 due to moisture can be prevented.

Instead of the highly viscous material 4, such as sealant for construction, adhesive, or the like, it is also possible to apply the present invention similarly to containers charged with a highly viscous material, such as mayonnaise, jam, or another such foodstuff. Moreover, provided that the cylindrical member 10 of the flexible container is made from a flexible film, then it can be formed in a shape other than a cylindrical shape.

INDUSTRIAL APPLICABILITY

According to the flexible container relating to the first phase of the present invention, merits are obtained in that: since the cylindrical member is made from flexible film, it is possible to make the container small after squeezed; since the bottom plate member and the ring member are harder than the flexible film, the handling characteristics of the charged flexible container can be improved; since the bottom plate member and the ring member can be fabricated independently from the cylindrical member, it is possible to achieve a small equipment and inexpensive injection moulds having excellent productivity as the equipment for forming the bottom plate member and the ring member; and moreover, since the bottom plate member and the ring member can be fabricated using exclusive moulding equipment, separately from the flexible cylindrical member, it is possible greatly to reduce the price of the equipment.

If a fitting section comprising is formed in the fuse-bonding portion of the cylindrical member and the bottom plate member and/or the ring member, as in the second phase of the present invention, then the bonding strength between the cylindrical member and the bottom plate member and/or the ring member is increased and the airtightness is also increased.

If a fitting section constituted by the circumference projection section is formed in a waveform shape which oscillates in the axial direction of the cylindrical member, as in the third phase of the present invention, then when the bottom plate member and/or the ring member is inserted with the cylindrical member, since the circumferential position of the cylindrical member caused to expand by the fitting section is changed step by step or continuously, and it is prevented that the full circumference of the fitting position of the cylindrical member in the axial direction is caused to expand at the same time, the portion of the cylindrical member outside the fitting portion assuming to be loose, then the insertability of the cylindrical member can be improved.

According to the method for manufacturing a flexible container, relating to the fourth phase of the present invention, similarly to the first phase of the present invention, since a bottom plate member and a ring member are fitted to the inner side of a cylindrical member and fused-bonding therewith airtightly, it is possible to reduce the price of the equipment, and moreover, since the bottom plate member and the ring member are harder than the flexible film, it is possible to fabricate a flexible container which is easy to handle and which can be reduced greatly in volume after discharging the highly viscous material from the flexible container.

If the cylindrical member is formed into a tapered cylindrical shape which decreases in diameter at the first end side, the bottom plate member is caused to face an opening at the second end side of the cylindrical member, and the bottom plate member is inserted into the first end side of the cylindrical member by relative movement of the cylindrical member and the bottom plate member, thereby fitting the bottom plate member to the first end section of the cylindrical member, as in the fifth phase of the present invention, then the integration of the bottom plate member can be improved remarkably, in addition to which, by adopting a composition wherein the inner diameter of the cylindrical member is equal to or slightly smaller than the external diameter of the bottom plate member, fused-bonding faults between the cylindrical member and the bottom plate member caused by the formation of wrinkles are prevented and the airtightness between both the members can be improved.

According to the method of manufacturing a flexible container, relating to the sixth phase of the present invention, merits similar to those of the fourth phase of the present invention, since a flexible film is wound about a bottom plate member and a ring member and then fused-bonding therewith airtightly, it is possible to improve the integration of the bottom plate member and the ring member remarkably compared to a case where the bottom plate member and the ring member are inserted by an injection moulding into a cylindrical member made from flexible film, and since handling of the cylindrical member made from flexible film is not required, it is possible to prevent formation faults due to deformation of the cylindrical member, or the like.

If the cylindrical member is heat fused-bonding to the bottom plate member and/or the ring member, using a heating plate having a plurality of semicircular heating faces, as in the seventh phase of the present invention, then it is possible effectively to prevent decrease in airtightness due to wrinkling of the cylindrical member.

If the range of forming the non-heating gaps is set to 20-30° at the central angle of the arc shape of the heating faces, as in the eighth phase of the present invention, then it is possible reliably to prevent decrease in airtightness due to wrinkling of the cylindrical member.

If projection strips for forming a fitting section are formed along the full length of the heating faces, in the intermediate section thereof in the lateral direction, as in the ninth phase of the present invention, then since a fitting section consisting of circumference grooves is formed in the fuse-bonding section between the cylindrical member and the ring member or the bottom plate member, it is possible remarkably to improve the airtightness and bonding strength between the cylindrical member and the bottom plate member and/or the ring member, similarly to the flexible container described in the second phase of the present invention.

According to the highly viscous material charged in the flexible container relating to the tenth phase of the present invention, since a highly viscous material is filled into a flexible container according to any one of the first to the third phases of the present invention, and a lid member is plugged airtightly into the ring member, in such a manner that no air remains inside the flexible container, then merits similar to those of the above-mentioned present invention. Moreover, when the lid member is plugged into the inner side of the ring member, it is possible to create tight contact between the lid member and the ring member, without the cylindrical member being interposed therebetween, and hence the airtightness between the lid member and the ring member can be improved.

The invention claimed is:

1. A method for manufacturing a flexible container, comprising the steps of:
   forming a flexible film into a cylindrical form and fabricating therefrom a cylindrical member which is formed into a tapered cylindrical shape decreasing in diameter at a first end side;
   a bottom plate member is caused to face an opening at a second end side of the cylindrical member, and the bottom plate member is inserted into the first end side of the cylindrical member by relative movement of the cylindrical member and the bottom plate member, thereby fitting the bottom plate member to the first end section of the cylindrical member;
   fitting a bottom plate member which is harder than the flexible film into the inner side of a first end section of said cylindrical member and fuse-bonding same airtightly, and fitting a ring member which is harder than the flexible film into the inner side of a second end section of the cylindrical member and fuse-bonding same airtightly.

2. The method of manufacturing a flexible container according to claims 1,
   wherein, when fuse-bonding said cylindrical member to the bottom plate member and/or the ring member, the cylindrical member is heat bonded to the bottom plate member and/or the ring member in a plurality of operations, using a heating plate having a plurality of semicircular heating faces, which press against the outer circumference of the bottom plate member and/or the ring member, via the cylindrical member, and which are positioned in such a manner that non-heating gaps of a prescribed length where the cylindrical member is not heated are formed in between the adjacent heating faces in a pressing state with the cylindrical member.

3. The method of manufacturing a flexible container according to claim 2,
   wherein the range of forming said non-heating gaps is set to 20 through 30 degree at a central angle of an arc shape of the heating faces.

4. The method of manufacturing a flexible container according to claim 2,
   wherein projection strips for forming a fuse-bonding section are formed along the full length of the heating faces, in the intermediate section thereof in the lateral direction.

* * * * *